United States Patent [19]

Carman et al.

[11] Patent Number: 5,160,509
[45] Date of Patent: Nov. 3, 1992

[54] SELF-BONDED CERAMIC ABRASIVE WHEELS

[75] Inventors: Lee A. Carman, Worcester, Mass.; William S. Coblenz, Arlington, Va.; Janet L. Hammarstrom, Auburn, Mass.

[73] Assignee: Norton Company, Worcester, Mass.

[21] Appl. No.: 704,162

[22] Filed: May 22, 1991

[51] Int. Cl.$^5$ .............................................. B24D 5/00
[52] U.S. Cl. ........................................ 51/307; 51/296; 51/309; 501/12; 501/81; 501/84; 501/127
[58] Field of Search ...................... 51/307, 309, 296; 501/12, 81, 82, 83, 84, 127

[56] References Cited

U.S. PATENT DOCUMENTS

| | | | |
|---|---|---|---|
| 3,616,841 | 11/1971 | Walz | 164/34 |
| 4,251,239 | 2/1981 | Clyde et al. | 55/132 |
| 4,404,007 | 9/1983 | Tukao et al. | 55/23 |
| 4,623,364 | 11/1986 | Cottringer et al. | 51/309 |
| 4,744,802 | 5/1988 | Schwabel | 51/309 |
| 4,867,758 | 9/1989 | Newkirk | 51/309 X |

FOREIGN PATENT DOCUMENTS 3628948  3/1988  Fed. Rep. of Germany.

OTHER PUBLICATIONS

Fujiu et al., "Processing and Properties of Cellular Silica Synthesized by Foaming Sol-Gels", J. Am. Ceram. Soc. 73(1) pp. 85-90 (1990).

Primary Examiner—Karl Group
Attorney, Agent, or Firm—David Bennett

[57] ABSTRACT

A grinding tool is described which comprises self-bonded particles of a ceramic abrasive and has a voids volume of from 5 to 65%.

6 Claims, No Drawings

SELF-BONDED CERAMIC ABRASIVE WHEELS

BACKGROUND OF THE INVENTION

This invention relates to grinding wheels made from a ceramic material and, particularly, to wheels which require no bonding medium to adhere and hold the ceramic materials in the structure.

Conventional grinding wheels comprise abrasive grit particles held in a matrix that may be vitreous, metallic or resinous in nature. The function of the matrix material is to give the structure physical integrity and strength so that when contacted with a workpiece, the abrasive grits are held tightly enough to ensure that the workpiece is abraded before the grain is worn down or detached from the wheel. In addition, it is desirable that the wheel have "structure", that is to say, it should have a degree of porosity that is determined by the intended use. This porosity helps to dissipate the heat generated by the grinding action and thus reduce burning of the surface of the workpiece. It also makes easier the removal of swarf generated by the cutting action without clogging of the grinding area.

Conventional grinding wheels are produced using two separate firing cycles. The first cycle fires the abrasive grits to their final crystalline form. The second is used to develop the bond which holds the grits together and to form the wheel. By controlling the amount of bond and abrasive material. It is possible to tailor the wheel to the intended use. Thus wheels for low wheel/work conformity, or high-pressure grinding such as external precision grinding or ball grinding, might use a wheel with a fairly low porosity; for example from 5 to 15% pore volume in the structure, while those where burning is a real problem might use a more open structure with a pore volume of 40 to about 65% or even higher. Grinding wheels do not, as a rule, have porosities greater than this because they need to have a certain structural strength to stand up to the strains of grinding operation. With somewhat higher porosities, say around 80% and higher, structures typical of filters and catalyst support materials are obtained and these are quite different from those suitable for grinding wheels. Ceramic materials such as alpha alumina are very hard and abrasion resistant. Particles of this material can be induced to sinter together in the absence of a bond material to form a coherent structure. If the structure is only partially sintered such that it contains porosity levels suitable for a grinding tool, the mechanical integrity of the structure is inadequate to withstand the forces of grinding. In addition, the high sintering temperature required for an alpha alumina structure leads to growth of the alpha alumina crystals to such an extent that the grinding performance of a structure comprised of such crystals, which is related to the crystal size, is significantly reduced. If high pressure is used to limit the grain growth at the sintering temperature, the products obtained lack the level of porosity required for a grinding tool.

An alternative approach is to use sol-gel technology to generate microcrystalline (generally sub-micron sized crystal structures), alpha alumina in situ in a mass having the form of the desired grinding tool such as a wheel. Coating a sol-gel derived grinding wheel, or for that matter, casting a sol, gel, slurry or slip, is unsatisfactory because of the significant amount of water which must be removed. The elimination of water is impeded by the thickness of the wheel through which the water must pass and the product may, in fact, be formed with voids or may even be crumbled by the internal forces generated upon drying. The problems are exacerbated if a sol-gel of an alumina precursor is used since this adds chemically bonded water that must be removed before conversion to the final fired alpha alumina form can be achieved. Thus, wheels of the thickness typically needed for grinding applications are difficult to obtain using this technique. Furthermore, the casting process inherently limits the range of porosity that can be attained and the products tend to have low porosity and to lack the internal strength to stand up to heavy grinding pressures.

Nevertheless, there is great attraction in the development of a one-step approach utilizing a single firing step to make grinding wheels and there is little doubt that a casting process for producing grinding wheels without the above disadvantages would have great significance. Such a process would, however, need to be controllable in terms of the porosity of the product obtained, and yet not require the use of a matrix bonding medium.

The present invention provides such a process and results in an abrasive wheel with a number of unique characteristics. The wheels produced by the process of the invention provide the benefits of controlled porosity in the context of a process that is essentially a single step and, consequently, very simple in operation.

DESCRIPTION OF THE INVENTION

The present invention provides a grinding tool having a self-bonded ceramic abrasive structure having from about 5 to about 65 vol. %, and preferably from about 30 to about 60 vol. %, and most preferably from about 40 to about 50% of voids.

The tool is conventionally a wheel, but it could also be a hone or wheel segment or other convenient means of presenting an abrasive substance to a workpiece. Its characterizing feature is that it is in the form of a ceramic reticulated structure. The structure, therefore, does not require a bond to give the tool a form as is the case with tools formed of the more conventional abrasive particles, though a material may be impregnated or incorporated into the structure for other reasons to impart desirable characteristics. The structure is described as "reticulated" in the sense of being a continuous network of ceramic material that defines an open or closed cell porous body.

The ceramic abrasive is self-bonded and by this is meant that the structure comprises essentially no added agent bonding distinct grains of the abrasive together. In fact, the tool comprises a porous structure in which the ceramic abrasive matrix is continuous. This matrix can further comprise reinforcing particles, fibers or filaments but, in general, these are not essential to give the structure its dimensional integrity. The porous structure has a generally uniform degree of porosity over the whole tool except where it is desired to provide a specific region with a higher density than another. The tool is not, however, characterized by random porosity variations.

The nature of the ceramic abrasive is restricted by the ability of the individual particles to sinter together to form a hard, coherent structure capable of functioning as an abrasive tool. Suitable materials include alumina, modified aluminas, alumina/zirconia, silicon carbide, cubic boron nitride and the like.

The preferred ceramic abrasive is alumina and the invention is described hereafter with particular reference to this material for the sake of simplicity. It is not, however, to be implied from this that there is any limitation to this material inherent in the invention. The preferred alumina used is a microcrystalline alumina by which is implied that the alumina is comprised essentially of sub-micron sized crystals of alpha alumina. Such products are commonly obtained by a seeded sol-gel process such as is described in U.S. Pat. Nos. 4,623,364 and 4,744,802. Other components may be present in the structure, such as fibrous or particulate ceramics or toughening additives such as zirconia and certain rare earth metal oxides. It is often desirable to increase the solids content by addition of up to about 55% of the solids weight of the mixture, of fine particles of alpha alumina or a precursor of alpha alumina such as gamma alumina. This would result in a composite gel rather than a sol or gel but would not otherwise change the nature of the process or the final product. It is also possible to use a slip or slurry comprising up to about 55% by weight of finely divided microcrystalline alpha alumina, or precursors thereof, in the process of the invention.

The sol, gel, composite gel, slurry or slip should preferably have as high a solids content as possible since this reduces the amount of water that has to be lost during the drying and sintering stages. This can be done, for example, by forming a boehmite gel with a minor amount (from about 0.1 to about 5% by weight for example) of sub-micron sized particles of alpha alumina to act as a seed material to reduce the temperature at which the conversion of the precursor to alpha alumina takes place and then adding an alpha alumina precursor that has been calcined at a temperature of from about 500 to about 900 degrees centigrade. The amount of the solid precursor that can be added in this way is limited by the ease with which the resulting high solids mix can be handled.

The regular porosity characterizing the tools of the invention can be induced by combining the slip, slurry, sol or gel with a solid pore-forming material in the desired shape, removing the water and firing to a temperature that is high enough to cause (where a sol-gel of an alpha alumina precursor is used) phase transformation to alpha alumina and sintering of the alpha alumina. The pore forming material can be a particulate organic material, such as walnut shells or plastic beads of the appropriate dimensions, or it can, more preferably, be a reticulated, open-celled foam of an organic material. In either event the firing will also have the effect of burning the material out leaving pores in the finished product. The preferred particulate pore former is walnut shells since these have a combination of hardness, combustibility and dimensional stability that makes them ideal for this purpose.

In a further embodiment of the above process the pore former may be a ceramic foam (which is understood to include honeycomb structures) and the interior walls are coated with same mixture described above which is then fired to convert it to alpha alumina. In such event, the ceramic foam used will have a pore volume in excess of about 70 volume % before treatment and the extent of treatment should be such as to leave a pore volume in the final product of from about 5 to about 65 volume %.

The amount of solid pore former that may be used is determined by the desired porosity of the final product. Because of shrinkage during water loss, the percent voids is often much greater than the volume of pore former added. Thus, if a 40% voids volume product is required, then 20% by volume of a pore former may be all that is needed. This is not an exact relationship and the behavior of each particular system must be determined by practical tests to derive a basis for predicting the amount that will be necessary in each case to obtain a desired level of porosity. These pore formers are most useful with products of high porosity such that an open celled structure is produced through which the combustion products can readily escape.

Another alternative means of generating the foam structure is by the use of physical or chemical blowing agents. These generate pores in the mix while it is in a plastic state. Chemical blowing agents are compounds that decompose at elevated temperatures to liberate a gas. Such agents, which can be added as part of the mix include chemicals, such as azodicarbonamide, ammonium hydrogen carbonate and benzene diazonium chloride. This gas expands at the elevated temperature to give the solidifying structure a porous nature. Alternatively, physical blowing agents can be used. These are gases that are injected into the mixture while it is at state of plasticity that the bubbles become trapped within the mixture and produce a foam structure. These kinds of blowing processes are difficult to control such that blowing occurs at a point at which the mixture is sufficiently reduced in water content to ensure that the pores, thus generated, do not immediately collapse when the gas escapes. It is, therefore, necessary to eliminate the water at comparatively low temperatures below those at which the pore formation occurs so that the mixture has sufficient dimensional stability to withstand the pressures generated by the gas. The physical properties of the mixture can advantageously be enhanced by the use of organic additives that confer green strength sufficient to allow expansion without disruption. It is also possible, where a sol-gel is used as the source of the alumina, to overcome the tendency of the foam bubbles to collapse by causing internal gelation using additives such as hexamethylene tetramine. This undergoes thermal decomposition to liberate ammonia which increases the pH of the mix and leads to gelation. Thus, bubble formation and solidification occur essentially simultaneously. A further means of obtaining the desired porosity is to extrude the material directly into a honeycomb structure from which a wheel can be obtained by trimming the extruded structure.

The most preferred way of obtaining the porous structure of the invention is by infiltrating a sol, gel, slurry or slip of an alpha alumina precursor or of alpha alumina itself into the pores of an open-celled foam preform in the shape of the desired tool and thereafter heating to bring about solidification of the structure, conversion to alpha alumina and elimination of the material of the open celled preform. In such a process it is, of course, necessary to ensure complete penetration of the pores by the sol, gel or slip. The penetration can be aided by pressure, providing this is not so great as to cause collapse of the cells before they are filled. It is also advantageous to evacuate the air from the foam so as more readily to permit entry of the precursor without air blocks.

The material from which the foam preform may be formed should have sufficient dimensional stability to withstand the conditions during the filling operation and yet be relatively easily removed during the sintering operation. In practice, it has been found that ceramic foams and thermoplastic resin foams, such as a polyurethane or polyolefin open celled foam, are suitable.

It is also possible to use a preform in the form of a shaped matt of a bonded fibrous material. Such materials are readily available commercially and, providing they are made of a material that is readily and cleanly burned off at sintering temperatures, are quite suitable for use in the present invention.

Finally, a ceramic reticulated structure with a porosity too great for practical use as an abrasive can be coated with an alumina based ceramic to reach the right level of porosity for abrasive use.

DESCRIPTION OF THE PREFERRED EMBODIMENTS

The present invention is now further described with reference to the following examples which are for the purpose of further describing preferred embodiments of the inventive concept and are not to be understood as implying any necessary limitation on the essential scope of the invention.

EXAMPLE 1

This example illustrates the production of a grinding wheel by infiltration of a foam with a sol-gel material, followed by drying and firing to form the abrasive wheel and to burn out the foam starting material.

A foam polyurethane pad, in the shape of the final desired wheel and having a porosity of about 40%, was infiltrated using a composite gel comprising a seeded sol-gel of sub-micron sized boehmite seeded with sub-micron sized alpha alumina particles and prepared using the process described in U.S. Pat. No. 4,623,364 (which is incorporated by reference herein in its entirety) and a calcined gamma alumina sol-gel derived powder with a surface area of approximately 100 square meters per gram and a mean particle diameter (determined by use of a sedigraph technique) of 1.5 micron. The sol-gel had a solids content of about 35 wt. % and the amount of calcined powder added wa 33 wt.% of the total weight. This mix was infiltrated into the foam polyurethane pad and the infiltrated pad was then dried at room temperature for two days and fired at 1300 degrees Centigrade for 60 minutes to yield the final product. The ramp rate to the firing temperature must be slow so as to prevent cracking. In fact, a ramp rate of about 25° C. per hour is used. The firing burned out the polyurethane material leaving a microcrystalline product formed entirely of alpha alumina. The total volume porosity of the final product was 42%. The wheel was trued with a single point diamond using a 0.002 inch/rev. lead and a 0.0005 inch wide diameter of dress. The trued wheel was then used to grind 52100 steel (hardness Rc 60) using an internal grinding test procedure. The test conditions were as follows:

Coolant — 5% soln. of Trim VHPE 300;
Wheel — 1.5 inch diameter; speed 13700 rpm, 5384 ft/min.
Workpiece Speed — 165 rpm or 117 ft/min.
Part diameter 2.7 in.
Total Infeed — 0.020 in.

It was found that the wheel gave a G-ratio of 51.3 at a power draw of 10.1 HP/inch. The surface finish was 41.7 microinch.

EXAMPLE 2

This example illustrates the use of pore inducing materials to obtain a product according to the invention.

A boehmite seeded sol gel with a solids content (calculated on the basis of $Al_2O_3$) of 24 wt. % similar to that described in Example 1, was mixed with 20 vol. % of walnut shells of average particle size 275 micrometers. This material was thoroughly mixed and molded into the shape of a wheel which was then dried at room temperature for two days and then the temperature was raised at about 25° C./hour, to a firing temperature of 1300° C. and held there for 60 minutes to convert the boehmite to alpha alumina and to burn out the walnut shells. The final product had a porosity of 40% and had sufficient strength to be used as a grinding wheel.

What is claimed is:

1. A grinding tool, selected from the group consisting of wheels, wheel segments and hones, having a self-bonded ceramic abrasive structure having from about 5 to about 65 volume % of voids.

2. A tool according to claim 1 in which the ceramic abrasive comprises alumina.

3. A tool according to claim 2 in which the alumina is microcrystalline alumina.

4. A tool according to claim 1 in which the volume % of voids is from about 30 to about 60%.

5. A tool according to claim 1 in the form of a grinding wheel.

6. A grinding wheel having a self-bonded, microcrystalline alpha alumina structure with a volume percent of voids of from about 40 to about 50%.

* * * * *